ANGLE OF ATTACK AND YAW TRANSMITTER

Filed March 31, 1955 5 Sheets-Sheet 1

ALBERT W. TONDREAU,
INVENTOR.

BY [signature]
ATTORNEY

June 2, 1959 A. W. TONDREAU 2,888,827

ANGLE OF ATTACK AND YAW TRANSMITTER

Filed March 31, 1955 5 Sheets-Sheet 2

ALBERT W. TONDREAU,
INVENTOR.

BY Orl R. Groshaw

ATTORNEY

June 2, 1959 A. W. TONDREAU 2,888,827

ANGLE OF ATTACK AND YAW TRANSMITTER

Filed March 31, 1955 5 Sheets-Sheet 3

ALBERT W. TONDREAU,
INVENTOR.

BY Orl R. Gorham

ATTORNEY

ALBERT W. TONDREAU,
INVENTOR.

BY Carl R. Gosham

ATTORNEY

June 2, 1959 A. W. TONDREAU 2,888,827

ANGLE OF ATTACK AND YAW TRANSMITTER

Filed March 31, 1955 5 Sheets-Sheet 5

ALBERT W. TONDREAU,
INVENTOR.

BY [signature]

ATTORNEY

United States Patent Office 2,888,827
Patented June 2, 1959

2,888,827

ANGLE OF ATTACK AND YAW TRANSMITTER

Albert W. Tondreau, Los Angeles, Calif., assignor of one-half to John B. Rudy, Sherman Oaks, Calif.

Application March 31, 1955, Serial No. 498,268

7 Claims. (Cl. 73—180)

This invention relates to angle of attack and angle of sideslip detecting apparatus for airborne units, such as planes, guided missiles, etc., and particularly to a vane actuated type of transmitter for providing an electrical output linearly proportional to the angle of attack and angle of sideslip, the output of which is transmitted to indicator or guiding control apparatus.

Equipment for providing electrical voltages and currents having a certain relationship to pitch and yaw angle variations is known. The present invention involves a new type of transmitter apparatus having several advantages over present transmitters, such as a more accurate bore alignment, more accurate control of high speed airplanes and guided missiles, and a voltage generation which is linear with respect to any angle variation from zero and not subject to vibration. By varying the size of the guiding fins and their angles, the transmitters can be adapted to any speed of the airborne unit.

To provide more accurate results, a universal connector assembly is provided which may be preset with respect to true verticals and horizontals. The new head of the transmitter is adjustable as to the friction encountered in movements of the head, and which has air conditioning or temperature control incorporated therein. Most apparatus for transmitting the angle of attack and angle of sideslip variations utilize potentiometers or resistances with slider units which are susceptible to the mechanical vibrations of the airborne unit. The present invention obtains the angle variation as variations in coil inductances which control the voltages transmitted to the receiving apparatus, such as telemetering units or direction control units.

The principal object of the invention, therefore, is to facilitate the accurate detection of the angle of attack or angle of sideslip of an airborne unit.

Another object of the invention is to provide an improved transmitter of the angle of attack and angle of sideslip of an airborne unit.

A further object of the invention is to provide an improved airborne detector of the angle of sideslip and angle of attack which is not subject to vibrations and which provides a linear electrical output with respect to the angle of attack and angle of sideslip.

A still further object of the invention is to provide an adjustable connector to insure proper alignment of the transmitter when attached to an airborne unit.

The novel features which are believed to be characteristic of this invention, both as to the manner of its organization and the mode of its operation, will be better understood from the following description when read in conjunction with the accompanying drawings, in which.

Figure 1:
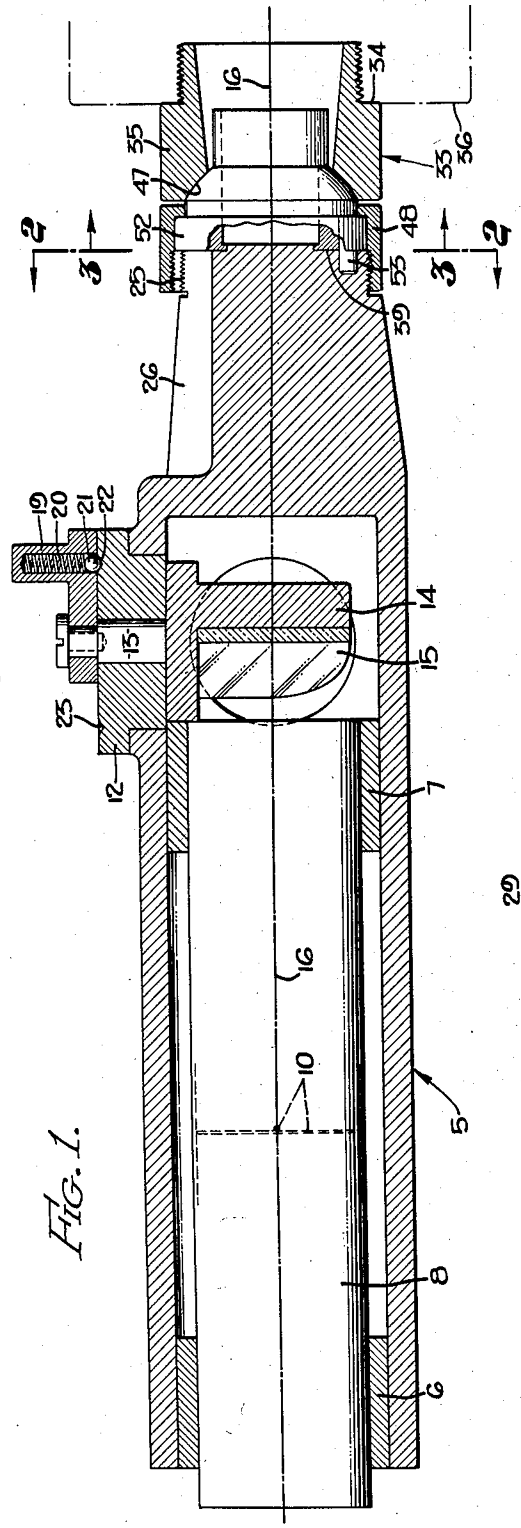
Fig. 1 is a cross-sectional view of an aligning instrument for the connecting, or coupling unit, of the transmitter for an airborne unit.

Referring now to the drawings in which the same numerals identify like elements, and particularly to Figs. 1 to 5, inclusive, a tubular housing 5 has mounted therein and on sleeves 6 and 7, a sighting tube 8 within which are a perpendicularly arranged set of crosshairs 10. There are two openings provided in the side of the housing 5 in planes parallel to the plane of the paper and an opening perpendicular thereto. In a bearing member 12 in the last mentioned opening is a shaft 13 on which is mounted a bracket 14 supporting a mirror 15 positioned at 45 degrees to the axis 16 of the tube 8. Since it may be desired to view the crosshairs 10 from either opening, the mirror may be rotated 180 degrees by the handle 19 in which is a spring 20 and ball 21 for positioning the mirror in either of the notches 22 or 23.

One end of the housing 5 is threaded, as shown at 25, the face of the threaded portion being accurately machined to be perpendicular to the axis 16. The end of the housing 5 is cut away at three equally spaced positions, as shown at 26, 27, and 28, to permit access to three adjusting screws 29, 30, and 31.

The purpose of the aligning instrument shown in Fig. 1 is to align the axis 16 with the axis of the coupling unit 33 with respect to the face 34 of the casting 35 of the coupling unit, which is threaded, as shown in Fig. 1, to a mounting 36 on the ship or guided missile, which may be either in the wing or nose. The instrument also orients the coupling unit so that when the transmitter 40 is attached to the coupling unit, its axis 43 is aligned with the axis of the coupling unit. The instrument also aligns the coupling unit to insure that the fins of the transmitter are aligned with the true verticals and horizontals of a guided missile or plane in level flight.

Figures 6, 7:
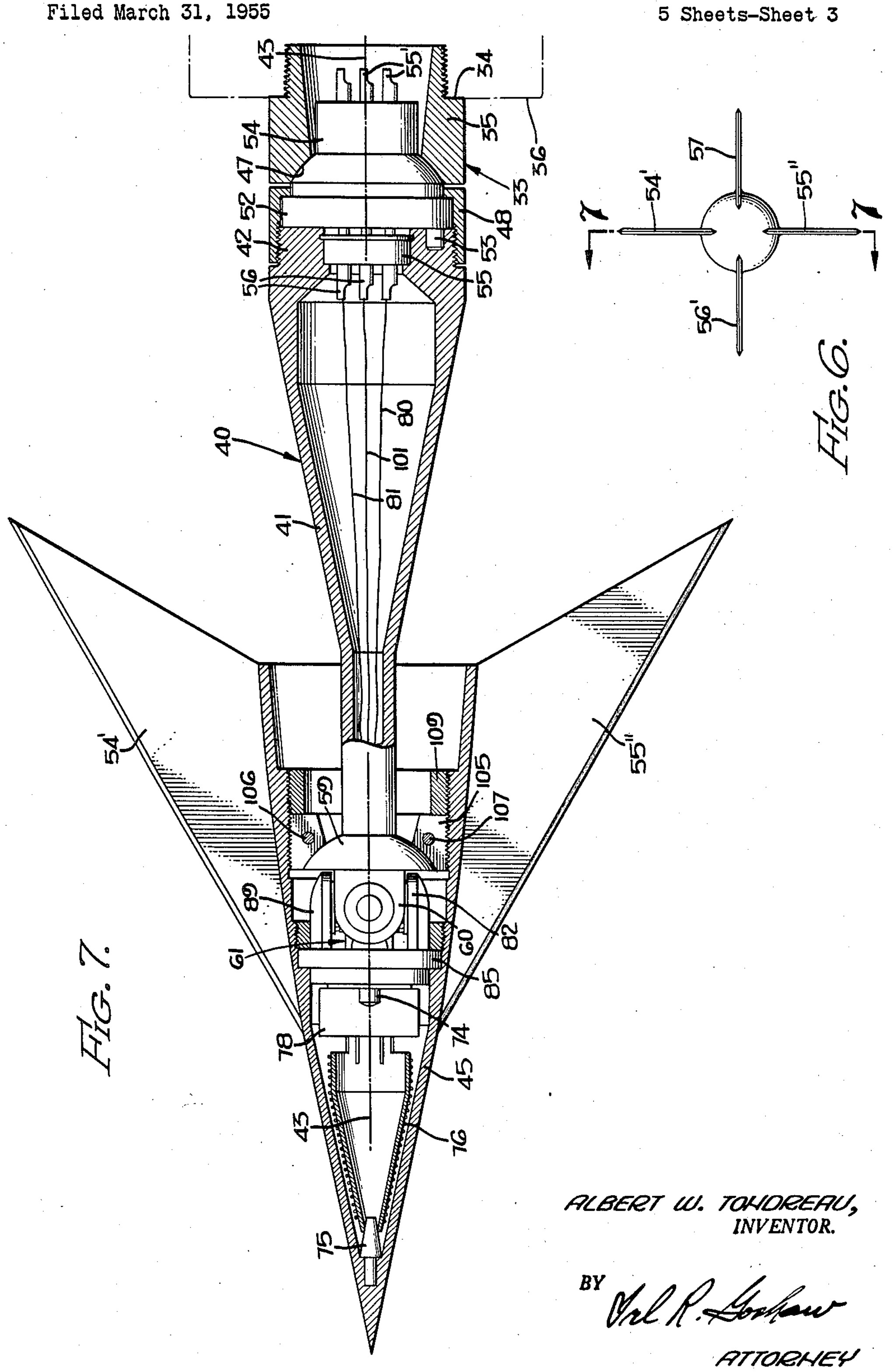
Fig. 6 is a front elevational view of the transmitter.
Fig. 7 is a cross-sectional view of the transmitter taken along the line 7—7 of Fig. 6.

To obtain these adjustments, the casting 35 of connector 33 has a spherically curved surface 47 which permits a cooperating casting 52 with a similar spherically curved surface to be moved in any direction. The adjustment of the casting 52 with respect to the casting 35 is obtained by the positioning of the three screws 29, 30, and 31, which pass through the casting 52 in elongated holes and into the casting 35. To obtain rotation of the casting 52 with respect to casting 35, an eccentric pin 50 having a screwdriver slot 51 therein passes through casting 35 and may be rotated in a hole in the casting 52. A threaded collar 48 with an inner flange contacting a shoulder of casting 52 connects the housing 5 to the casting 52, there being two master dowels 37 and 53 in the end of housing 5 which are accommodated in two holes in the member 52. These dowels maintain a fixed rotational alignment between the instrument and the connector 33. The casting 52 is hollow so that an electrical connecting plug 54 having six pins may be mounted, three of these pins being shown at 55 in Fig. 7 and all six pins being shown in Fig. 5. A plug 55' with its pins 56 is mounted in the end portion 42 of the fuselage 41 of the transmitter 40, connection between the plugs being made when the transmitter is attached to the connecting unit.

Figure 3:
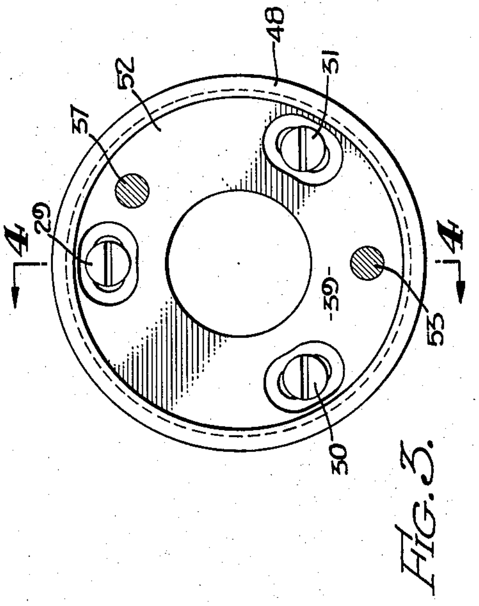
Fig. 3 is a view of the coupling unit taken along the line 3—3 of Fig. 1.
Figure 2:
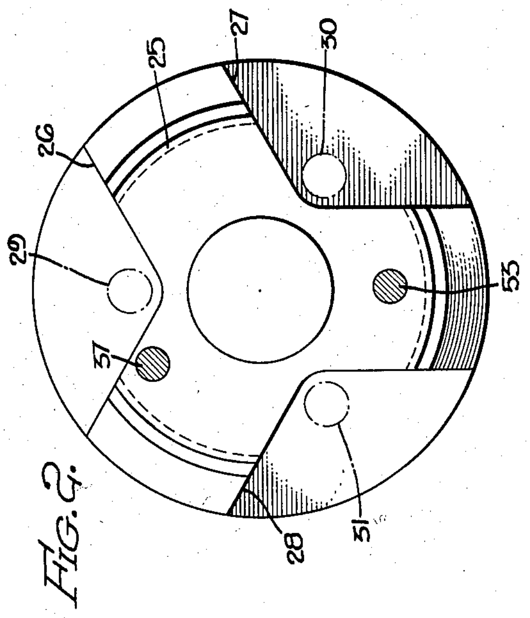
Fig. 2 is an end view of the aligning instrument taken along the line 2—2 of Fig. 1.

To make the alignment, a target is positioned at a distance from the end of the tube 8, the target being two crosslines on a board or paper which are truly vertical and horizontal and correspond to the true vertical and horizontal of the missile or plane. The axis of the coupling unit 33 attached to the missile may or may not be exactly perpendicular to the true vertical and horizontal of the missile. To obtain these adjustments, housing 5 is attached by the collar 48 to the mounting unit 33 with the dowels in place, and the screws 29, 30, and 31 are set for an approximate alignment. Then by viewing the target through the openings in the housing 5 by light reflected by the mirror 15, the housing 5 is adjusted by the screws 29, 30, and 31, so that the center of the crosshairs falls on the center of the target. When this is accomplished, it is possible that the full length of the crosshairs are not coincident with the crossmarks on the target. In this event, rotation of the eccentric pin 50 will rotate the crosshairs 10 on the axis 16. The vertical and horizontal adjustments are accomplished by tightening and loosening of the screws 29, 30, and 31, rotation of casting 52 being permitted by the elongated holes as shown in Fig. 3. When these adjustments are accomplished, the screws 29, 30, and 31 are tightened and the axis 16 of the coupling unit 33 is then perpendicular to the surface 39 and has been adjusted for any error existing in the surface 34 of mounting 36. Now, when the transmitter unit 40 with similar dowel pins is attached to the coupling unit 33, it will have its axis perpendicular to the true vertical and horizontal of the airborne unit and the vertical vanes 54′ and 55″, which are perpendicular to horizontal vanes 56′ and 57 will be in coincidence with the true vertical and horizontal planes of the airborne unit.

Figure 10:
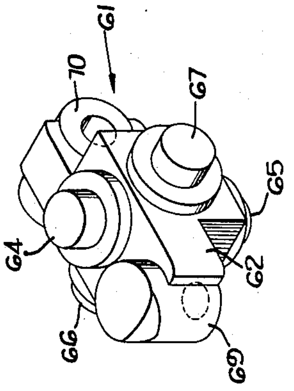
Fig. 10 is a perspective view of the universal joint used in the transmitter.
Figure 4:
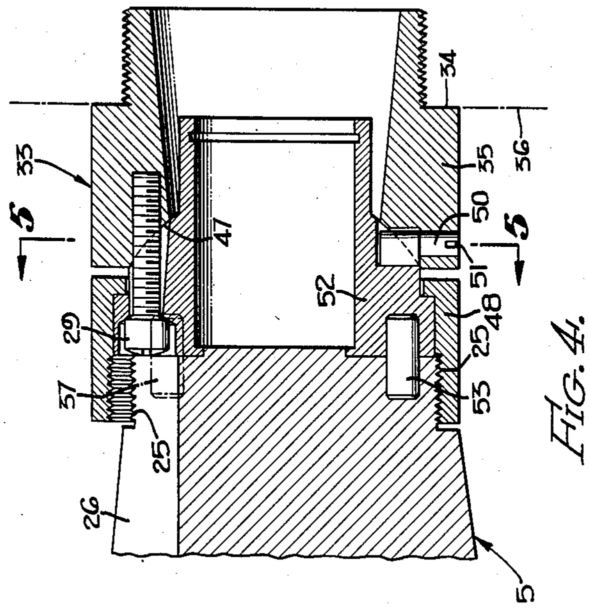
Fig. 4 is a cross-sectional view of the coupling unit taken along the line 4—4 of Fig. 3.
Figure 5:
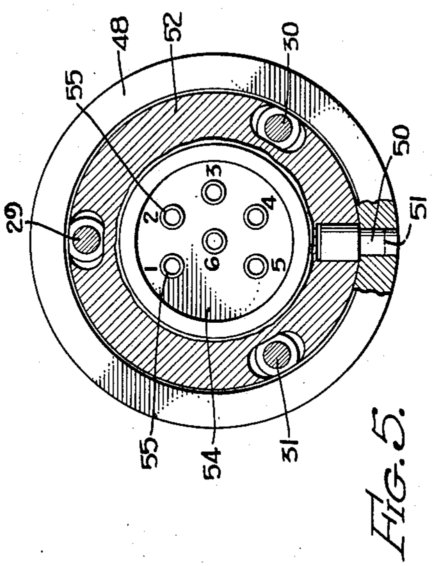
Fig. 5 is a view of the coupling unit taken along line 5—5 of Fig. 4.

The transmitter mentioned above consists of a tapered fuselage 41 having one end 42 attachable to the coupling unit 33 and the other end terminating in a socket 59 with an outer spherically curved surface and having two bearing mounting ears 60 and 63. The transmitter provides an electrical output linearly proportional to the angle of variation of the head 45 from the vertical and horizontal planes, in which are vanes 54′, 55″, 56′, and 57. The head 45 is movable in perpendicular directions as on a universal unit 61, shown in perspective in Fig. 10. This unit 61 has a central casting 62, on which are formed stub shafts 64 and 65 in axial alignment and stub shafts 66 and 67 in axial alignment and whose axis perpendicularly intersects the axis of stub shafts 64 and 65. At one end of the casting 62 is mounted an inductance coil 69 and having an axis parallel with the axis of stub shafts 64 and 65. A similar coil 70 is mounted on the other end of the casting 62 and has its axis parallel to the axis of stub shafts 66 and 67 and perpendicular to the axis of coil 69. These coils are shielded by cylinders of powdered iron. As shown in Fig. 10, coils 69 and 70 are cylindrical, but it is to be understood that these coils may be wound as portions of a toroid so that their powdered iron armatures, such as 72 and 73, will move within the coils along the respective curved axes thereof.

Figure 11:
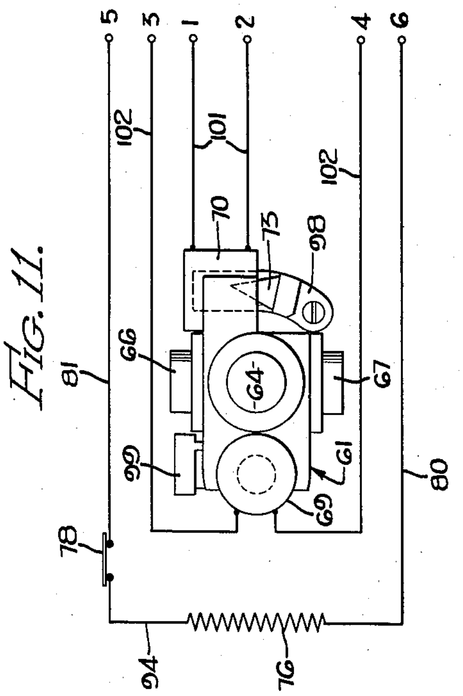
Fig. 11 is a wiring diagram for the transmitter.
Figure 8:
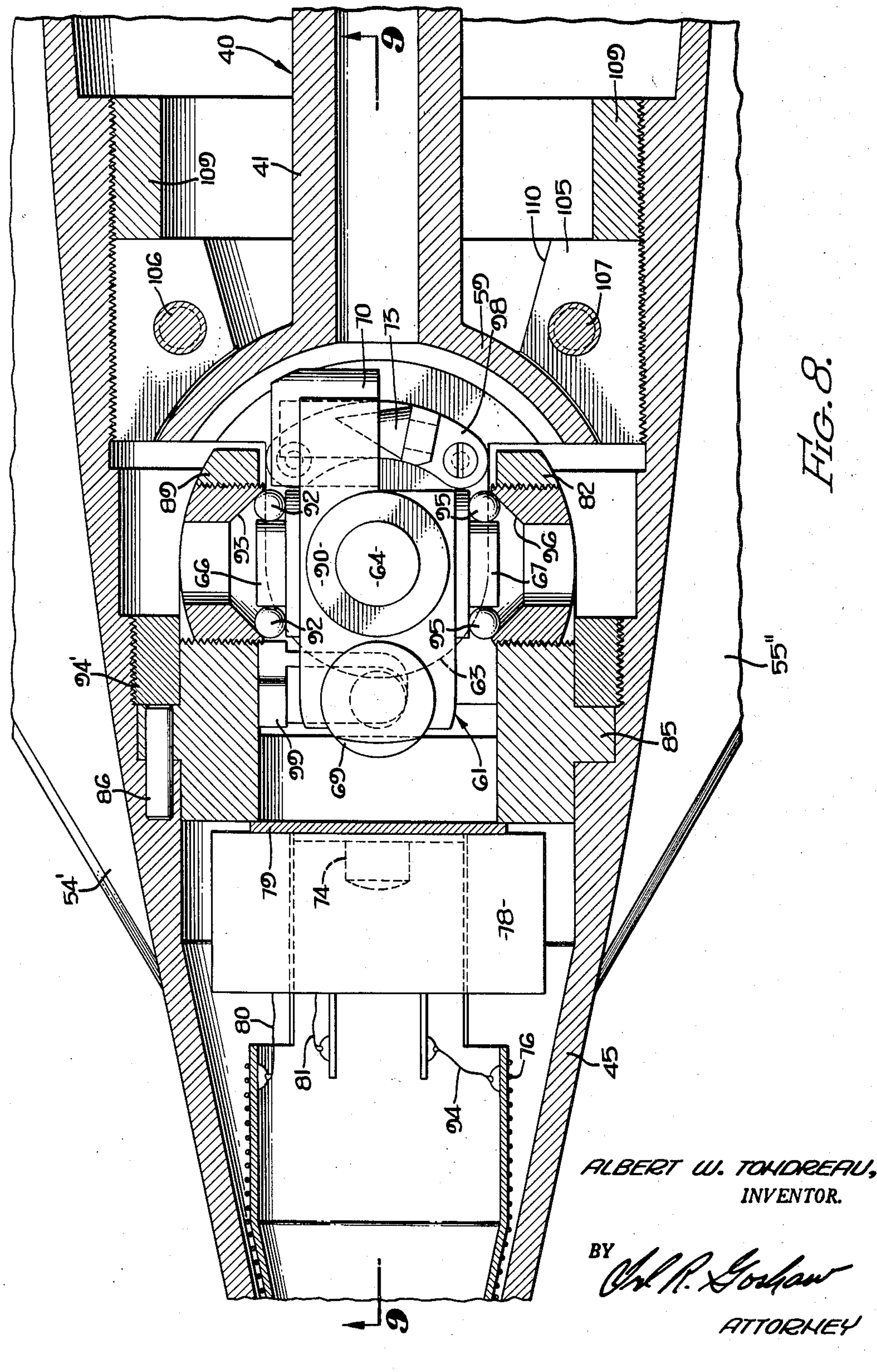
Fig. 8 is a vertical enlarged sectional view of the transmitter similar to Fig. 7.

Referring now to the nose of the head 45, a tapered centering pin 75 centers the forward end of a conical heating element 76, the rear end being attached to a casting 85 by screws 74. The casting 85 has bearing ears 82 and 89 identical to ears 60 and 63 on fuselage 41. A thermostatic unit 78 is attached to a plate 79 held on casting 85 by screws 74. The cone 76 is wound with a heat resisting wire, such as Nichrome, and glazed, the two ends of the wire being connected to connections 80 and 94. As shown in Fig. 8, the current will be conducted from the thermostatic unit 78 over conductor 94 to the heat resisting wire of unit 76, and then over conductor 80 to an energy source, then back over conductor 81 to the thermostatic unit 78. These connections are also shown in Fig. 11. Thus, any desired temperature of the interior of the fuselage is maintained by this controlled heating system.

Figure 9:
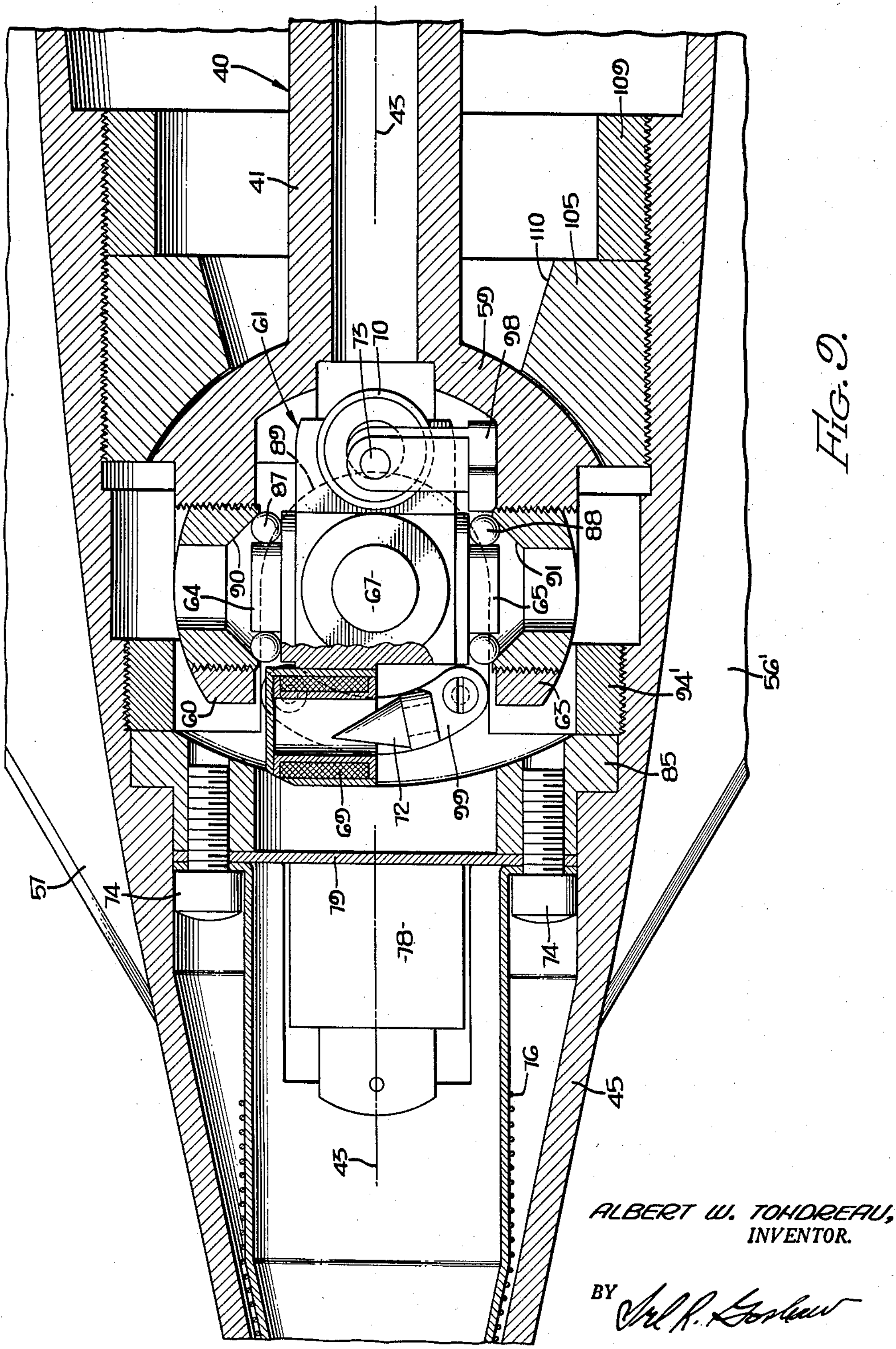
Fig. 9 is a cross-sectional view of the transmitter taken along the line 9—9 of Fig. 8.

The cylindrical casting ring 85 is held in a fixed predetermined rotational position with respect to head 45 by a dowel 86 in the wall of the head 45 and in a fixed axial position by its face abutting a shoulder of the interior of the head 45. The universal unit 61 shown in Fig. 10 is mounted in bearing races threaded into the four ears 60 and 63 and 82 and 89. The stub shaft 64 is mounted on ball bearings 87, the ball bearings 87 being held in a tapered race 90 threaded into the ear 60. The ball bearings 88 are held in a tapered race 91 threaded into the ear 63 on the opposite side of the casting from race 90. (See Fig. 9.) The stub shaft 66 is mounted on ball bearings 92 in a race 93 threaded into the ear 89, while stub shaft 67 is mounted on ball bearings 95 held in a race 96 threaded into the ear 82. (See Fig. 8.) By rotation of the respective races of the bearings, any desired degree of tightness or friction may be obtained in the bearings for control of the head movement with respect to the fuselage.

Fixedly mounted on ear 63 between the ears 60 and 63 is an arcuate bracket 98 supporting the armature 73 which will be inserted into the coil 70 as the head 45 rotates on the axis of stub shafts 64 and 65. Similarly mounted on ear 89 between ears 82 and 89 is an arcuate bracket 99 supporting the armature 72 which will move into and out of the coil 69 depending upon the amount of rotation of the head 45 on the axis of the stub shafts 66 and 67. As shown in Fig. 11, the variation in inductance of coil 70 caused by movement of the armature 73 therein will be conducted to an indicating meter or control device over conductors 101, while the change in inductance in coil 69 caused by movement of the armature 72 therein will be conducted over conductors 102 to the desired instrument or actuator in the airborne unit whose direction is to be controlled.

To assemble the head unit on the fuselage 41, an externally threaded nut 94′ threads into the head to fixedly hold casting 85 having ears 82 and 89 to the head after the rotational position is fixed by dowel 86. A split nut 105 having a spherically curved surface and connectors 106 and 107 is threaded up closely but not in contact with the spherically curved surface of 59 to prevent dust and moisture from entering the head. A lock nut 109 holds nut 105 in position. This lock nut may be of different weights to counterbalance the head. The nut 105 has a sloping internal surface 110 to permit the fuselage to have a greater degree of movement. The entire assembly of heater 76, universal unit 61 with its coils and thermostat 78 is inserted in the nose of the head 45, the pin 75 centering one end of the assembly and the dowel 86 positioning the universal joint 61 properly within the head 45 and with respect to its vanes 54′, 55″, 56′, and 57.

Since the shape of the armatures 72 and 73 are so tapered with respect to their respective coils 69 and 70, the movement of the armatures is a linear function of the variation in the inductance produced by this movement. Also since there is no contacting or sliding elements on electrical units, there will be no variations in electrical output caused by vibration and no varying mechanical resistance to movements of the head. There will be no chance of broken or interrupted electrical connections such as are prevalent in potentiometer detectors, although it is possible to use a potentiometer by substituting sliders for the armatures and resistance wires for the coils. Furthermore, since it is the change in inductance which is indicating varying angles and the inductances are kept at a substantially constant temperature, an accurate detection of the angle variations is always made.

The polarization of the coils may be with either alternating current or direct current voltage, alternating current being preferred depending upon the terminal equipment being actuated. The primary source may be a direct current voltage and a vibrator used to transform the voltage to an alternating current voltage. In any event, the change in reactance of the circuits in which each coil is connected is made linearly proportional to the variations in the angles of the head from zero position.

I claim:

1. An angle of attack and yaw transmitter for an airborne unit comprising a hollow fuselage having a pair of ears having coaxial openings therein, a tapered head for said transmitter, said head having extending vanes at right angles to one another, a casting fastenable to the interior of said head in a certain rotational position, said casting having a pair of ears having coaxial openings therein, the axis of said first mentioned ears intersecting and perpendicular to the axis of said second mentioned ears, the axis of said fuselage intersecting the point of intersection of said axes, a bearing in each of said openings, a universal joint mounted in said bearings to permit angular movement of said head in the two planes of said vanes, a pair of hollow coils mounted on said universal joint, said coils having their axes perpendicular to one another, and an armature mounted on one ear of each of said pairs of ears for movement within respective coils in accordance with variations in angle of attack and yaw of said airborne unit.

2. An angle of attack and yaw transmitter in accordance with claim 1, in which a heater and a thermostat are positioned within said head to maintain a constant temperature therein.

3. An angle of attack and yaw transmitter for an airborne unit comprising a fuselage having a socket with an outer spherically curved surface, a pair of ears extending from said socket, the other end of said fuselage having a threaded portion for attachment to an airborne unit, a nut having an internally spherically curved surface adjacent the spherically curved surface of said socket to permit relative movement therebetween and close the interior of said socket, a pointed hollow head portion having positioned externally at the rear thereof two pairs of vanes at right angles to one another, said vanes being in vertical and horizontal positions corresponding to the vertical and horizontal positions of said airborne unit, said nut being attached to the interior of said head, a casting adapted to be attached to the interior of said head, said casting having a pair of ears extending therefrom, all of said ears having bearings mounted therein, the axis of said pair of ears on said socket being perpendicular and intersecting the axis of the pair of ears on said casting, a universal joint having stub shafts adapted to be accommodated in said bearings, coil means located on said universal joint, and an armature mounted on one of each pair of said ears and movable with respect to said coil means in accordance with the variation of the axis of said head with respect to the axis of said fuselage for transmitting electrical values to said airborne unit.

4. An angle of attack and yaw transmitter in accordance with claim 3, in which a heating unit and a thermostatic control therefor is provided in the front portion of the interior of said head.

5. An angle of attack and yaw transmitter in accordance with claim 3 in which said coil means includes a pair of coils mounted on said universal joint and having their axes perpendicular to one another, said armature being adapted to be moved within said coils in an amount dependent upon the movement of the axis of said head with respect to the axis of said fuselage.

6. A transmitter for producing electrical variations corresponding to the attack and yaw angles of an airborne unit comprising a body portion adapted to have one end attached to an airborne unit, the other end of said body portion having a pair of extensions therefrom, a bearing located in each of said extensions and having coincident axes, a head portion consisting of a hollow tapered body portion, a plurality of vanes extending externally from the rear portion of said head, one pair of vanes being in a certain plane and another pair of vanes being in a plane perpendicular to said certain plane and with respect to said airborne unit, a casting attachable to the interior of said head in a certain rotational position, said casting having a pair of extensions therefrom, a bearing in each of said extensions and having coincident axes, the axes of said last mentioned bearings being perpendicular to the axes of said first mentioned bearings and intersecting each other, a universal unit having stub shafts with axes perpendicular to one another and adapted to be positioned in said bearings to permit movement of the axis of said head with respect to the axis of said body portion as varied by said vanes, a coil mounted on said unit and having an axis parallel with the axis of one pair of stub shafts, a second coil mounted on said unit with its axis parallel with the other pair of stub shafts, an armature mounted on one of said extensions and adapted to be moved in and out of said coils, and an armature mounted on one of said other pair of extensions and adapted to be moved in and out of said other coil, the variation in position of said armatures in said coils varying the impedance of said coils in accordance with the angle of departure of the axis of said head with respect to the axis of said body portion.

7. A transmitter in accordance with claim 6, in which a heater unit and the thermostat control thereof is mounted in the forward hollow portion of said head.

References Cited in the file of this patent

UNITED STATES PATENTS

| | | |
|---|---|---|
| 2,221,547 | Kollsman | Nov. 12, 1940 |
| 2,380,635 | Samsonow | July 31, 1945 |
| 2,402,856 | Turrettini | June 25, 1946 |
| 2,538,303 | Findley | Jan. 16, 1951 |
| 2,554,634 | Paine | May 29, 1951 |
| 2,556,873 | Geisse | June 12, 1951 |
| 2,563,780 | Fontaine | Aug. 7, 1951 |
| 2,588,974 | Fontaine | Mar. 11, 1952 |
| 2,662,402 | Ince et al. | Dec. 15, 1953 |
| 2,701,501 | Cuny | Feb. 8, 1955 |